US012806722B2

(12) United States Patent
Kim et al.

(10) Patent No.: US 12,806,722 B2
(45) Date of Patent: Nov. 24, 2026

(54) METHOD OF MANUFACTURING PLANETARY GEAR CARRIER

(71) Applicants: HYUNDAI TRANSYS INC., Seosan-si (KR); KOREA SINTERED METAL CO., LTD., Daegu (KR)

(72) Inventors: Tae Hoon Kim, Hwaseong-si (KR); Kyoung Rok Do, Daegu (KR); Joo Sung Park, Daegu (KR); Dong Kuk Jeong, Daegu (KR); Kyu Ho Kim, Hwaseong-si (KR)

(73) Assignees: HYUNDAI TRANSYS INC., Seosan-si (KR); KOREA SINTERED METAL CO., LTD., Daegu (KR)

( * ) Notice: Subject to any disclaimer, the term of this patent is extended or adjusted under 35 U.S.C. 154(b) by 591 days.

(21) Appl. No.: 18/475,994

(22) Filed: Sep. 27, 2023

(65) Prior Publication Data

US 2024/0359276 A1 Oct. 31, 2024

(30) Foreign Application Priority Data

Apr. 27, 2023 (KR) ........................ 10-2023-0055755

(51) Int. Cl.
*B23P 15/14* (2006.01)
*B23K 26/21* (2014.01)
*C23C 8/38* (2006.01)
*F16H 57/08* (2006.01)

(52) U.S. Cl.
CPC .............. *B23P 15/14* (2013.01); *B23K 26/21* (2015.10); *C23C 8/38* (2013.01); *F16H 57/082* (2013.01)

(58) Field of Classification Search
CPC .......... B23K 26/32; B23K 26/21; C23C 8/38; F16H 57/082
See application file for complete search history.

(56) References Cited

U.S. PATENT DOCUMENTS

2020/0331085 A1 10/2020 Eseltine et al.

FOREIGN PATENT DOCUMENTS

| | | | |
|---|---|---|---|
| CN | 103836171 | A | 6/2014 |
| CN | 107178606 | A | 9/2017 |
| DE | 102020104389 | A1 | 8/2020 |
| JP | 51141748 | A * | 12/1976 |

(Continued)

OTHER PUBLICATIONS

Kim Tae Hoon et al., "Welding Technology of Sintered Material Carrier and Alloy Steel Gear for Automatic Transmission", KSAE 2022 Annual Autumn Conference & Exhibition, Nov. 16-17, 2022, Jeju, Korea.

*Primary Examiner* — Thien S Tran
(74) *Attorney, Agent, or Firm* — Bridgeway IP Law Group, PLLC; Jihun Kim

(57) ABSTRACT

A method of manufacturing a planetary gear carrier includes a sintering step of forming a front carrier cap by sintering, an ion-nitrided layer forming step of forming an ion-nitrided layer on a surface of the sintered front carrier cap, a welding portion machining step of machining a surface of a welding portion of the front carrier cap by a thickness of the formed ion-nitrided influence layer, and a welding step of welding a welding portion of the front carrier cap connected to a component with a different type of material different from a material of the front carrier cap so that the welding portion is joined to the component with the different type of material.

8 Claims, 3 Drawing Sheets

(56) References Cited

FOREIGN PATENT DOCUMENTS

| | | | | | |
|---|---|---|---|---|---|
| JP | S51-141748 | A | | 12/1976 | |
| JP | 53131911 | A | * | 11/1978 | |
| JP | S53-131911 | A | | 11/1978 | |
| JP | H04-62679 | U | | 5/1992 | |
| JP | H0625643 | U | | 4/1994 | |
| JP | H07112231 | A | | 5/1995 | |
| JP | H08300174 | | * | 11/1996 | |
| JP | H08300174 | A | | 11/1996 | |
| JP | 2005-299894 | A | | 10/2005 | |
| JP | 2006-298273 | A | | 11/2006 | |
| JP | 2007268575 | A | * | 10/2007 | ........... F16H 57/082 |
| KR | 10-2001-0038555 | A | | 5/2001 | |
| KR | 10-2095239 | B1 | | 3/2020 | |

* cited by examiner

METHOD OF MANUFACTURING PLANETARY GEAR CARRIER

CROSS-REFERENCE TO RELATED APPLICATIONS

This application claims priority to and the benefit of Korean Patent Application No. 10-2023-0055755 filed in the Korean Intellectual Property Office on Apr. 27, 2023, the entire contents of which are incorporated herein by reference.

STATEMENT REGARDING PRIOR DISCLOSURES BY THE INVENTORS

Applicant hereby states that a prior disclosure was made on or around Nov. 16, 2022, which originated directly or indirectly by the inventor(s), and the prior disclosure made by the inventor(s) does not qualify as prior art under the grace period exception under 35 USC § 102(b)(1). Information regarding the prior disclosure is provided as a non-patent literature in an accompanying information disclosure statement submitted with the application filing.

TECHNICAL FIELD

The present invention relates to a method of manufacturing a planetary gear carrier.

BACKGROUND ART

In general, a planet gear is a gear supported by a carrier and disposed between a sun gear and a ring gear. The planet gear is a constituent component of an overdrive mechanism. The sun gear is fixed to a driving shaft of a main shaft of a transmission and transmits a rotational force, and the ring gear is connected to a driven shaft of the main shaft of the transmission and transmits driving power to a propulsion shaft.

The planetary gear carrier engages with a spline of the driven shaft of the main shaft of the transmission and supports the planet gear fitted between the sun gear and the ring gear.

The planetary gear carrier includes a front carrier plate and a front carrier cap. The front carrier plate may be joined to one side of the front carrier cap by brazing. An annulus gear may be coupled to the other side of the front carrier cap by welding.

The front carrier plate and the front carrier cap may be manufactured by various methods such as casting, forging welding, press welding, and sintering.

Sintering is a method of manufacturing a product by heating and solidifying a powdered molded product and may easily manufacture components with complicated shapes, such as the front carrier plate and the front carrier cap.

However, in case that the sintered front carrier cap is generally welded to the components, such as the annulus gear, made of different types of materials, bubbles or cracks occur at welding portions, which makes it difficult to ensure strength of the component. Further, there is a large dispersion of welding quality depending on the composition of sintering powder and the type of material to be joined, which makes it difficult to manage the quality.

DOCUMENT OF RELATED ART

Patent Document (Patent Document 1) Korean Patent No. 10-2095239 (published on Mar. 31, 2020)

SUMMARY OF THE INVENTION

The present invention has been made in an effort to provide a method of manufacturing a planetary gear carrier, which forms an ion-nitrided layer on a surface of a sintered front carrier cap, and performs dry machining on a welding portion of the formed front carrier cap so that the ion-nitrided layer does not remain on the welding portion, thereby preventing a welding defect such as the occurrence of bubbles or cracks in the welding portion during a laser welding process.

An exemplary embodiment of the present invention provides a method of manufacturing a planetary gear carrier, the method including: a sintering step of forming a front carrier cap by sintering; an ion-nitrided layer forming step of forming an ion-nitrided layer on a surface of the sintered front carrier cap; a welding portion machining step of machining a surface of a welding portion of the front carrier cap by a thickness of the formed ion-nitrided influence layer; and a welding step of welding a welding portion of the front carrier cap connected to a component with a different type of material different from a material of the front carrier cap so that the welding portion is joined to the component with the different type of material.

A thickness of an ion-nitrided influence layer formed on the surface of the front carrier cap may be 0.3 to 0.5 mm.

In the sintering step, the front carrier cap may be sintered so that a carbon (C) content is 0.1 to 0.6% based on an overall content.

In the welding portion machining step, dry machining may be performed on the surface of the welding portion of the front carrier cap without using machining oil at the time of machining the surface of the welding portion of the front carrier cap.

When machining oil is used to machine the surface of the welding portion of the front carrier cap, a de-oiling step of removing the machining oil by heating the front carrier may be added.

In the welding step, the welding may be laser welding.

Before the ion-nitrided layer forming step, a front carrier plate may be formed in the same way as the front carrier cap in the sintering step, and sintering and sintering brazing may be simultaneously performed on a connection portion between the formed front carrier plate and the formed front carrier cap.

In the ion-nitrided layer forming step, the ion-nitrided layer may also be formed on a surface of the front carrier plate together with the surface of the front carrier cap.

The component with the different type of material may be an annulus gear.

The component with the different type of material may be made of carbon alloy steel.

According to the present invention, the ion-nitrided layer is formed on the surface of the sintered front carrier cap, and the dry machining is performed on the welding portion of the formed front carrier cap so that the ion-nitrided layer does not remain on the welding portion, thereby preventing a welding defect such as the occurrence of bubbles or cracks in the welding portion during the laser welding process.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
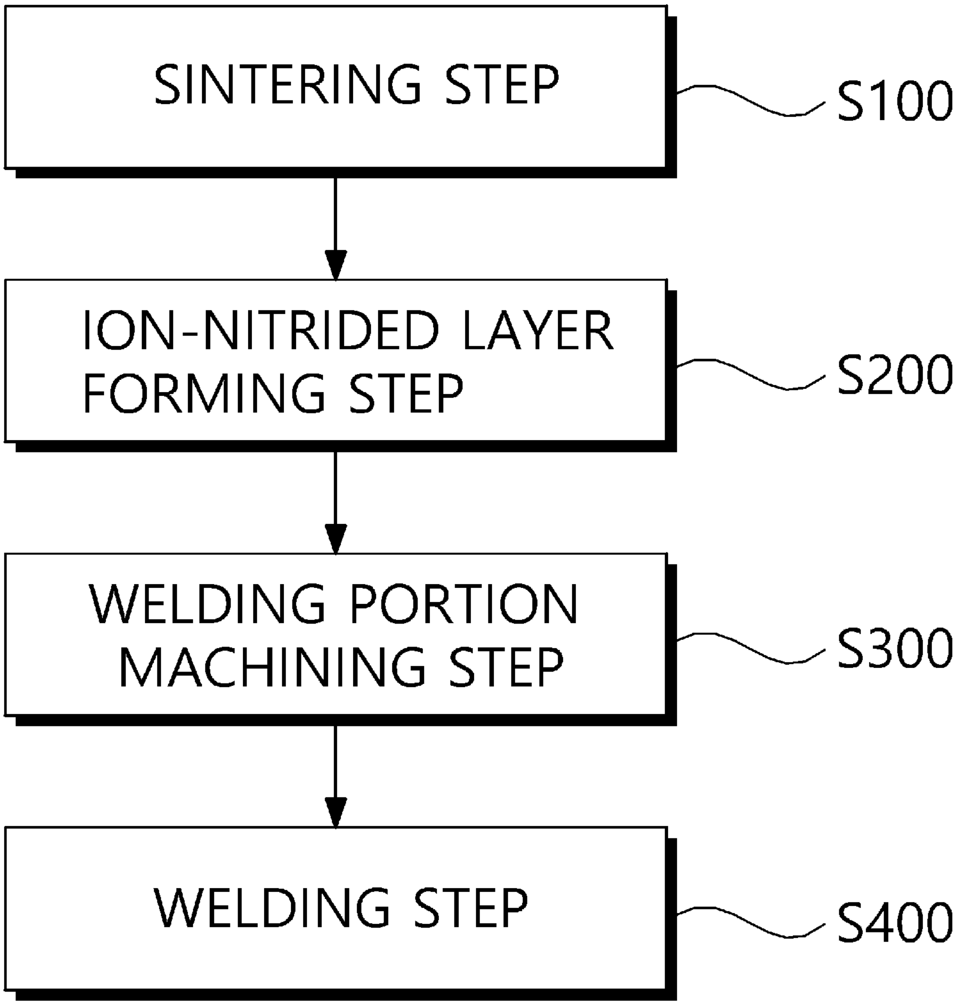
FIG. 1 is a flowchart illustrating a manufacturing process of a method of manufacturing a planetary gear carrier according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
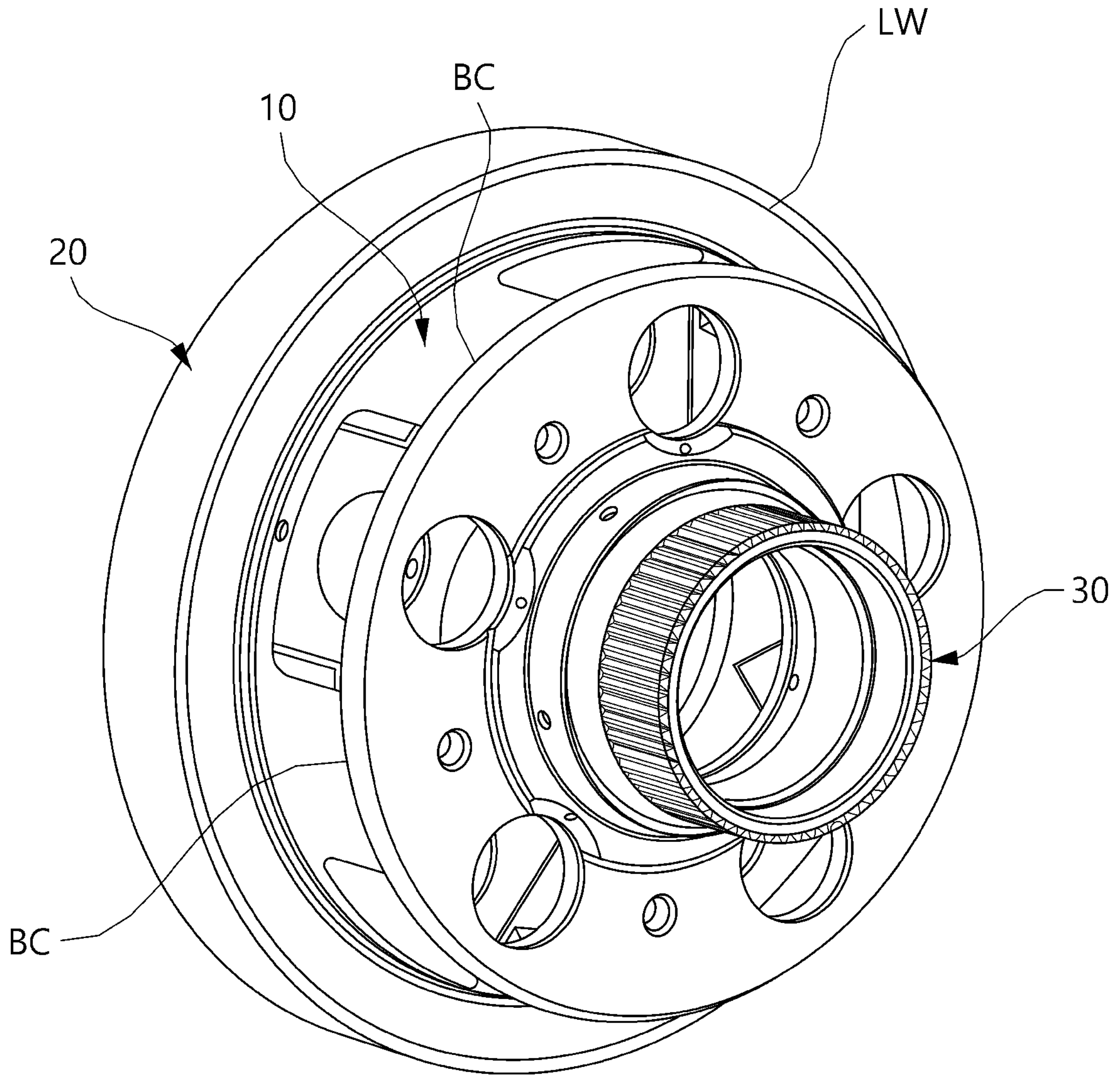
FIG. 2 is a perspective view illustrating a planetary gear carrier according to the exemplary embodiment of the present invention.
Figure 3:
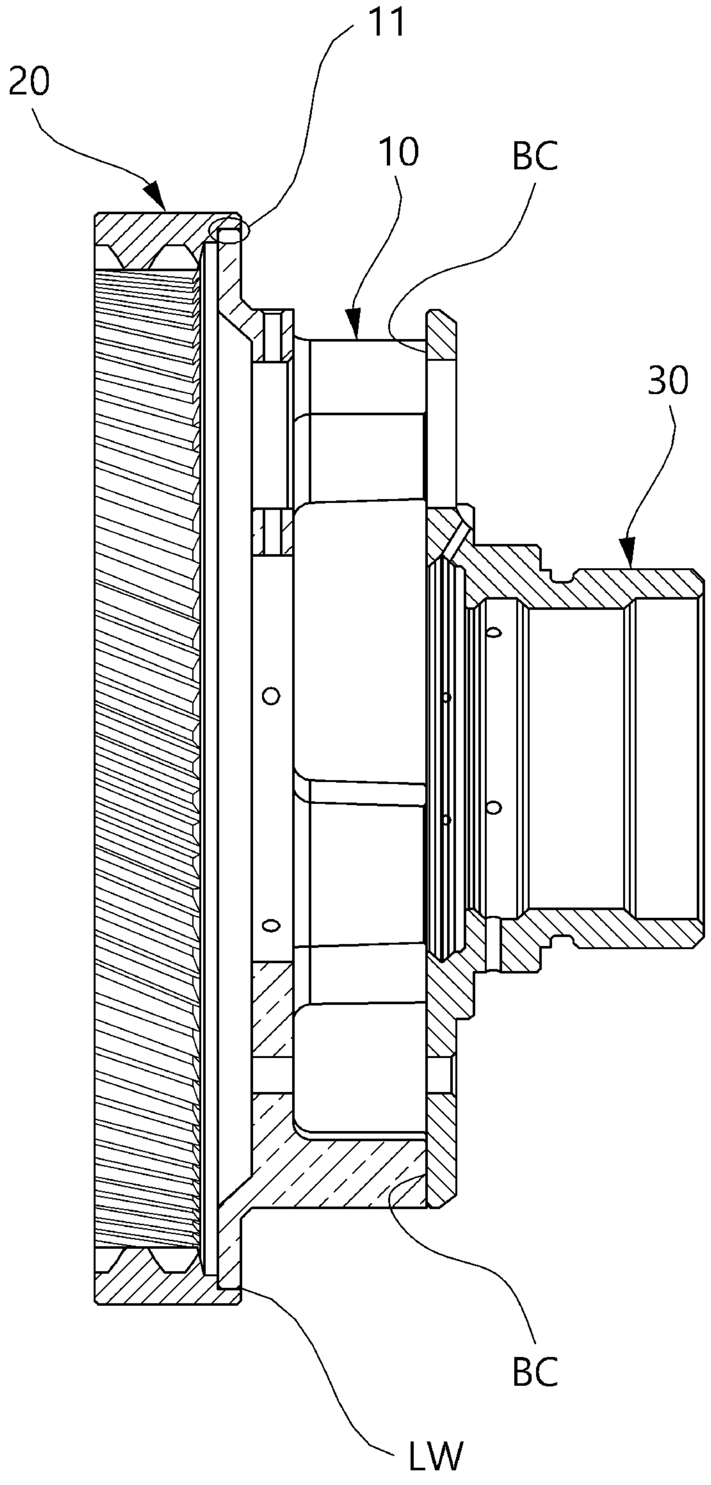
FIG. 3 is a cross-sectional side view illustrating the planetary gear carrier according to the exemplary embodiment of the present invention.

FIG. 1 is a flowchart illustrating a manufacturing process of a method of manufacturing a planetary gear carrier according to an exemplary embodiment of the present invention, FIG. 2 is a perspective view illustrating a planetary gear carrier according to the exemplary embodiment of the present invention, and FIG. 3 is a cross-sectional side view illustrating the planetary gear carrier according to the exemplary embodiment of the present invention.

As illustrated in FIGS. 1 to 3, a method of manufacturing a planetary gear carrier according to the present invention includes a sintering step S100, an ion-nitrided layer forming step S200, a welding portion machining step S300, and a welding step S400.

In the sintering step S100, a front carrier cap 10 and a front carrier plate 30 are formed, and then sintering and sintering brazing are simultaneously performed.

For example, the front carrier cap 10 may be sintered so that a carbon (C) content is 0.1 to 0.6% based on the overall content.

For example, if the carbon (C) content exceeds 0.6% based on the overall content of the front carrier cap 10, a melting point of a welding portion decreases during a laser welding process, and there occurs a great difference in melting point between different types of materials, which may cause bubbles.

The occurrence of bubbles during the laser welding process may degrade the quality of the front carrier cap 10. Therefore, the front carrier cap 10 may be sintered so that the carbon (C) content is 0.6% or less based on the overall content of the front carrier cap 10.

The connection portion between the sintered front carrier plate 30 and the front carrier cap 10 may be joined by sintering brazing BC.

For example, the front carrier plate 30 may also be sintered in the same way as the front carrier cap 10.

For example, before the front carrier plate 30 and the front carrier cap 10 are brazed, brazing portions of the front carrier plate 30 and the front carrier cap 10 may be processed to have shapes suitable for brazing so that the brazing may be easily performed.

In the ion-nitrided layer forming step S200, an ion-nitrided layer with a predetermined thickness is formed on surfaces of the front carrier plate 30 and the front carrier cap 10 that are in the joined state.

The ion-nitrided layer 20 may improve hardness and durability of the front carrier cap 10 and the front carrier plate 30.

For example, a thickness of an ion-nitrided influence layer formed on the surfaces of the front carrier cap 10 and the front carrier plate 30 may be 0.3 to 0.5 mm.

In the welding portion machining step S300, a surface of a welding portion 11 of the front carrier cap 10 is machined by a thickness of the formed ion-nitrided influence layer.

For example, because of the nitrogen content of the ion-nitrided layer and the ion-nitrided influence portion, bubbles may occur during a laser welding process, which may degrade the quality of the front carrier cap 10.

As described above, in case that the laser welding process is performed in a state in which the ion-nitrided layer remains on the surface of the welding portion 11 of the front carrier cap 10, bubbles may occur in the structure of the welding portion 11 of the front carrier cap 10. Therefore, the surface of the welding portion 11 of the front carrier cap 10 may be machined so that the ion-nitrided layer does not remain.

Dry machining may be performed without using machining oil (cutting oil) at the time of machining the surface of the welding portion 11 of the front carrier cap 10.

In case that the machining oil is used to machine the surface of the welding portion 11 of the front carrier cap 10, a de-oiling step of heating the front carrier cap 10 to completely remove the machining oil after the machining process is additionally required.

For example, if the machining oil is used to machine the surface of the welding portion 11 of the front carrier cap 10, the machining oil penetrates into the structure of the welding portion 11 of the front carrier cap 10, which may cause bubbles during the laser welding process. Therefore, the dry machining may be performed on the surface of the welding portion 11 of the front carrier cap 10.

Frictional heat may be generated between the surface of the welding portion 11 and a machining tool in case that the dry machining is performed on the surface of the welding portion 11 of the front carrier cap 10.

In order to minimize the frictional heat generated between the machining tool and the surface of the welding portion 11 of the front carrier cap 10, the dry machining may be performed on the surface of the welding portion 11 of the front carrier cap 10 in a state in which a machining rate is maximally lowered.

For example, a de-oiling process may be performed to remove oil remaining on the front carrier cap 10 by heating the front carrier cap 10.

In the welding step S400, laser welding LW is performed on the welding portion 11 of the front carrier cap 10 connected to a component 20 with a different type of material different from the material of the front carrier cap 10 so that the welding portion 11 is connected to the component 20 with the different type of material.

For example, before the laser welding LW is performed, the welding portion 11 of the front carrier cap 10 may be processed to have a shape suitable for the laser welding.

For example, the component 20 with the different type of material may be an annulus gear made of a carbon alloy steel (SCr420HB).

As described above, according to the present invention, the ion-nitrided layer may be formed on the surface of the sintered front carrier cap, and the laser welding is performed in the state in which the dry machining is performed on the surface of the welding portion of the front carrier cap so that the ion-nitrided layer does not remain before the laser welding, such that a welding defect such as the occurrence of bubbles or cracks in the welding portion may be prevented.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of manufacturing a planetary gear carrier, the method comprising:

forming a front carrier plate to be connected to a front carrier cap, and sintering and sintering brazing simultaneously on a connection portion between the front carrier plate and the front carrier cap to form a joined state of the front carrier plate and the front carrier cap;

forming an ion-nitrided layer on a surface of the front carrier cap together with a surface of the front carrier plate while the front carrier plate and the front carrier cap are in the joined state;

machining a surface of a welding portion of the front carrier cap to a depth equivalent to a thickness of the ion-nitrided layer to remove the ion-nitrided layer from the welding portion; and welding the welding portion of the front carrier cap connected to a component with a material different from that of the front carrier cap to integrally join the welding portion and the component.

2. The method of claim 1, wherein the thickness of the ion-nitrided layer formed on the surface of the front carrier cap is in a range of 0.3 to 0.5 mm.

3. The method of claim 1, wherein the front carrier cap is sintered to have a carbon (C) content of the front carrier cap in a range of 0.1 to 0.6% based on an overall content.

4. The method of claim 1, wherein in machining of the surface of the welding portion, dry machining is performed on the surface of the welding portion of the front carrier cap without using machining oil during the machining.

5. The method of claim 1, wherein when machining oil is used to machine the surface of the welding portion of the front carrier cap, removing the machining oil by heating the front carrier cap is performed.

6. The method of claim 1, wherein in welding of the welding portion, the welding is performed by a laser welding.

7. The method of claim 1, wherein the component is an annulus gear.

8. The method of claim 7, wherein the component is made of carbon alloy steel.

* * * * *